(12) United States Patent
Kulkarni

(10) Patent No.: US 12,506,638 B2
(45) Date of Patent: Dec. 23, 2025

(54) SYNCHING CONTROL AREA NETWORK (CAN) DATABASES USING REMOTE TRANSMISSION REQUESTS TO CONTROL CAN COMMUNICATION IN A VEHICLE

(71) Applicants: Hyundai Motor Company, Seoul (KR); Kia Corporation, Seoul (KR)

(72) Inventor: Ashwin Kulkarni, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 327 days.

(21) Appl. No.: 18/448,422

(22) Filed: Aug. 11, 2023

(65) Prior Publication Data

US 2025/0055725 A1    Feb. 13, 2025

(51) Int. Cl.
*H04L 67/025* (2022.01)
*H04L 12/40* (2006.01)

(52) U.S. Cl.
CPC .......... *H04L 12/40013* (2013.01); *H04L 2012/40215* (2013.01); *H04L 2012/40273* (2013.01)

(58) Field of Classification Search
CPC ..... H04L 12/40013; H04L 2012/40215; H04L 2012/40273
See application file for complete search history.

(56) References Cited

U.S. PATENT DOCUMENTS

| | | | |
|---|---|---|---|
| 9,705,699 B2* | 7/2017 | Lee | H04L 41/34 |
| 10,083,149 B2* | 9/2018 | Hartwich | G06F 13/4022 |
| 11,256,498 B2* | 2/2022 | Van Der Maas | G06F 8/654 |
| 11,323,548 B2* | 5/2022 | Entelis | H04L 67/5651 |
| 11,539,782 B2 | 12/2022 | Kulkarni | |
| 11,616,862 B2* | 3/2023 | Stein | H03M 7/707 370/474 |
| 11,706,049 B2* | 7/2023 | Mutter | H04L 12/40071 710/305 |
| 11,909,553 B2* | 2/2024 | Mutter | H04L 12/413 |
| 12,225,044 B2* | 2/2025 | Shin | H04W 12/08 |
| 2016/0112215 A1* | 4/2016 | Lee | H04L 41/34 370/235 |
| 2017/0180152 A1* | 6/2017 | Cink | H04L 12/40013 |

(Continued)

FOREIGN PATENT DOCUMENTS

| | | | |
|---|---|---|---|
| EP | 4035442 B1 * | 8/2025 | |
| KR | 10-1549034 B1 | 9/2015 | |

*Primary Examiner* — Jay P Patel
(74) *Attorney, Agent, or Firm* — Fox Rothschild LLP

(57) ABSTRACT

Systems and methods for controlling CAN communication in a vehicle are provided. The method may comprise storing CAN message information in the plurality of CAN databases such that each CAN database stores a unique configuration of the CAN message information, determining a system mode of operation comprising determining one or more LSBs of a DLC and comparing the one or more LSBs of the DLC against a database to determine the system mode of operation, generating an RTR message comprising determining one or more MSBs of the DLC and adding the one or more MSBs of the DLC to an end of an identifier, generating an RTR request value comprising the identifier and the one or more MSBs of the DLC, communicating the RTR message, to the plurality of ECUs, interpreting the RTR request value to determine the requested answer value, and communicating the requested answer value.

20 Claims, 9 Drawing Sheets

(56) References Cited

U.S. PATENT DOCUMENTS

| | | | |
|---|---|---|---|
| 2017/0262400 A1* | 9/2017 | Hartwich | G06F 13/4286 |
| 2019/0026103 A1* | 1/2019 | Van Der Maas | G06F 11/0784 |
| 2021/0320816 A1* | 10/2021 | Mutter | H04L 12/413 |
| 2022/0046114 A1* | 2/2022 | Entelis | H04L 69/04 |
| 2022/0070020 A1* | 3/2022 | Mutter | H04L 12/40071 |
| 2022/0159098 A1* | 5/2022 | Stein | H03M 7/707 |
| 2022/0303305 A1* | 9/2022 | Shin | H04L 63/1441 |
| 2022/0407619 A1* | 12/2022 | Senger | H04L 1/0061 |
| 2023/0079725 A1* | 3/2023 | Lee | H04L 12/40 726/25 |
| 2023/0106378 A1* | 4/2023 | Pese | H04L 63/0428 726/6 |
| 2024/0333757 A1* | 10/2024 | Shin | H04L 63/1416 |

* cited by examiner

CAN DATABASE 1: INTERNAL STRUCTURE

| DATA FIELD | IDENTIFIER (ID FOR THE MESSAGE) | DATA LENGTH CODE (DLC) LENGTH | PAYLOAD BYTE 1 | PAYLOAD BYTE 2 | PAYLOAD BYTE 3 | PAYLOAD BYTE 4 |
|---|---|---|---|---|---|---|
| SPEED | 100 | LENGTH = 2 | 7 | 5 | | |
| TEMPERATURE | 101 | LENGTH = 3 | 1 | 0 | 2 | |
| ENGINE TEMPERATURE | 102 | LENGTH = 3 | 3 | 4 | 6 | |

CAN DATABASE 2: INTERNAL STRUCTURE

| DATA FIELD | IDENTIFIER (ID FOR THE MESSAGE) | DLC LENGTH | PAYLOAD BYTE 1 | PAYLOAD BYTE 2 | PAYLOAD BYTE 3 | PAYLOAD BYTE 4 |
|---|---|---|---|---|---|---|
| SPEED | 102 | LENGTH = 2 | 7 | 5 | | |
| TEMPERATURE | 100 | LENGTH = 3 | 1 | 0 | 2 | |
| ENGINE TEMPERATURE | 101 | LENGTH = 3 | 3 | 4 | 6 | |

FIG. 2

SYNCHING CONTROL AREA NETWORK (CAN) DATABASES USING REMOTE TRANSMISSION REQUESTS TO CONTROL CAN COMMUNICATION IN A VEHICLE

BACKGROUND

Technical Field

The present disclosure relates generally to controller area network (CAN) communication in a vehicle, and more particularly, to synching CAN databases using remote transmission requests (RTRs) to control CAN communication in a vehicle.

Background

Controller area networks, or CANs, are often utilized in vehicles to implement a robust, relatively inexpensive in-vehicle network connecting several electronic control units (ECUs) in charge of controlling certain vehicle functions, such as climate control, vehicle displays (i.e., clusters), infotainment systems, and the like. A typical CAN utilizes a CAN bus which enables the ECUs in the CAN to communicate with each other without a host computer. The ECUs can send and receive data across the CAN bus in packets called frames.

In this regard, FIG. 1 is a diagram illustrating a conventional CAN data frame. The purpose of the CAN data frame is typically to transmit vehicle data, user data, or the like. The CAN data frame is composed of several different components, each designated for performing a particular task, including a start of frame (SOF) bit, an identifier (ID) which sets the priority of the data frame, a remote transmission request (RTR) bit, an Identifier Extension (IDE) bit, a data length code (DLC), a data field, a cyclic redundancy check (CRC) sequence, a delimiter (DEL) bit, an acknowledgement (ACK) bit, and end of frame (EOF) bits. Among these, the payload bytes can be transported in the data field, and the DLC field can communicate the number of payload bytes to the receivers.

Problematically, when ECUs transmit CAN data frames across the network, these communications can be vulnerable to hacking due to the open communication channel utilized in CANs. As such, vehicle CANs can be susceptible to intrusions by hackers who may attempt to read and decode the CAN messages by physically connecting to the CAN bus or using on-board (OBD) ports to access the CAN bus. Then, the hacker can decode or reverse engineer the intercepted data. Hackers can also inject messages on the CAN bus which may trigger system malfunction or misbehavior.

SUMMARY

According to an object of the present disclosure, a method for controlling controller area network (CAN) communication in a vehicle including a plurality of electronic control units (ECUs) and a plurality of CAN databases accessible by the plurality of ECUs is provided. The method may comprise storing CAN message information in the plurality of CAN databases such that each CAN database stores a unique configuration of the CAN message information, and determining a system mode of operation. The determining the system mode of operation may comprise determining one or more least significant bits (LSBs) of a data length code (DLC), and comparing the one or more LSBs of the DLC against a database to determine the system mode of operation. The method may further comprise generating a remote transmission request (RTR) message. The generating the RTR request may comprise determining one or more most significant bits (MSBs) of the DLC, and adding the one or more MSBs of the DLC to an end of an identifier, generating an RTR request value comprising the identifier and the one or more MSBs of the DLC, wherein the RTR request value is associated with a requested answer value which is associated with the system mode of operation. The method may further comprise communicating the RTR message, through a CAN bus, to the plurality of ECUs, interpreting the RTR request value to determine the requested answer value, generating the requested answer value, and communicating the requested answer value to the plurality of ECUs.

According to an exemplary embodiment, the one or more LSBs of the DLC may comprise two LSBs of the DLC.

According to an exemplary embodiment, the one or more MSBs of the DLC may comprise two MSBs of the DLC.

According to an exemplary embodiment, the answer value may comprise a time value at which each ECU performs CAN communication based upon the uniquely configured CAN message information stored in a particular CAN database among the plurality of CAN databases, and the particular CAN database may be identified by a database reference number.

According to an exemplary embodiment, the method may further comprise, when a subsequent interval among the plurality of periodic intervals begins, receiving a plurality of measurement values deriving from a plurality of sensors equipped in the vehicle, calculating a new database reference number by using the plurality of measurement values and one or more random numbers, the new database reference number newly identifying a particular CAN database among the plurality of CAN databases, and performing CAN communication, by each ECU, based upon the uniquely configured CAN message information stored in the newly identified CAN database.

According to an exemplary embodiment, the answer value may comprise a new data reference number, and the new database reference number may identify a particular CAN database among the plurality of CAN databases.

According to an exemplary embodiment, the method may further comprise designating a particular ECU among the plurality of ECUs as a master ECU to control one or more operations of the method for controlling CAN communication. The remaining ECUs may operate as slave ECUs, and the answer value may comprise a next master identification number.

According to an object of the present disclosure, a system for controlling CAN communication in a vehicle is provided. The system may comprise a plurality of ECUs equipped in the vehicle, a plurality of CAN databases configured to store CAN message information such that each CAN database stores a unique configuration of the CAN message information, a plurality of sensors equipped in the vehicle communicatively coupled to the plurality of ECUs, and a CAN bus through which the plurality of ECUs are configured to perform CAN communication. The plurality of ECUs, in performing the CAN communication, may be configured to determine a system mode of operation comprising determining one or more LSBs of a DLC and comparing the one or more LSBs of the DLC against a database to determine the system mode of operation, generate an RTR message, comprising determining one or more MSBs of the DLC and adding the one or more MSBs of the DLC to an end of an identifier, generating an RTR request value comprising the identifier and the one or more MSBs of the DLC, wherein the RTR request value is associated with a requested answer value which is associated with the system mode of operation, communicate the RTR message, through a CAN bus, to the plurality of ECUs, interpret the RTR request value to determine the requested answer value, generate the requested answer value, and communicate the requested answer value to the plurality of ECUs.

According to an exemplary embodiment, the one or more LSBs of the DLC may comprise two LSBs of the DLC.

According to an exemplary embodiment, the one or more MSBs of the DLC may comprise two MSBs of the DLC.

According to an exemplary embodiment, the answer value may comprise a time value at which each ECU performs CAN communication based upon the uniquely configured CAN message information stored in a particular CAN database among the plurality of CAN databases, and the particular CAN database may be identified by a database reference number.

According to an exemplary embodiment, the plurality of ECUs, when a subsequent interval among the plurality of periodic intervals begins, may be configured to receive a plurality of measurement values deriving from a plurality of sensors equipped in the vehicle, calculate a new database reference number by using the plurality of measurement values and one or more random numbers, the new database reference number newly identifying a particular CAN database among the plurality of CAN databases, and perform CAN communication, by each ECU, based upon the uniquely configured CAN message information stored in the newly identified CAN database.

According to an exemplary embodiment, the answer value may comprise a new data reference number, and the new database reference number may identify a particular CAN database among the plurality of CAN databases.

According to an exemplary embodiment, the plurality of ECUs may be configured to designate a particular ECU among the plurality of ECUs as a master ECU to control one or more operations of the method for controlling CAN communication, the remaining ECUs may be configured to operate as slave ECUs, and the answer value may comprise a next master identification number.

According to an object of the present disclosure, a system for controlling CAN communication in a vehicle is provided. The system may comprise a plurality of ECUs equipped in the vehicle, a plurality of CAN databases configured to store CAN message information such that each CAN database stores a unique configuration of the CAN message information, a plurality of sensors equipped in the vehicle communicatively coupled to the plurality of ECUs, a CAN bus through which the plurality of ECUs are configured to perform CAN communication, and a computing device, comprising a processor and a memory, configured to store programming instructions. The programming instructions, when executed by the processor, may be configured to cause the processor to determine a system mode of operation comprising determining one or more LSBs of a DLC and comparing the one or more LSBs of the DLC against a database to determine the system mode of operation, generate an RTR message, comprising determining one or more MSBs of the DLC and adding the one or more MSBs of the DLC to an end of an identifier, generating an RTR request value comprising the identifier and the one or more MSBs of the DLC, wherein the RTR request value is associated with a requested answer value which is associated with the system mode of operation, communicate the RTR message, through a CAN bus, to the plurality of ECUs, interpret the RTR request value to determine the requested answer value, generate the requested answer value, and communicate the requested answer value to the plurality of ECUs.

According to an exemplary embodiment, the one or more LSBs of the DLC may comprise two LSBs of the DLC.

According to an exemplary embodiment, two MSBs may be added out of a 4-bit DLC to an 11-bit identifier and, together, may form a 13-bit number whose range can extend along a range of possible values. According to an exemplary embodiment, the range of possible values may be from 1 to 8192.

According to an exemplary embodiment, the one or more MSBs of the DLC may comprise two MSBs of the DLC.

According to an exemplary embodiment, the answer value may comprise a time value at which each ECU performs CAN communication based upon the uniquely configured CAN message information stored in a particular CAN database among the plurality of CAN databases, and the particular CAN database may be identified by a database reference number.

According to an exemplary embodiment, the plurality of ECUs, when a subsequent interval among the plurality of periodic intervals begins, may be configured to receive a plurality of measurement values deriving from a plurality of sensors equipped in the vehicle, calculate a new database reference number by using the plurality of measurement values and one or more random numbers, the new database reference number newly identifying a particular CAN database among the plurality of CAN databases, and perform CAN communication, by each ECU, based upon the uniquely configured CAN message information stored in the newly identified CAN database.

According to an exemplary embodiment, the answer value may comprise a new data reference number, and the new database reference number may identify a particular CAN database among the plurality of CAN databases.

According to an exemplary embodiment, the plurality of ECUs may be configured to designate a particular ECU among the plurality of ECUs as a master ECU to control one or more operations of the method for controlling CAN communication, the remaining ECUs may be configured to operate as slave ECUs, and the answer value may comprise a next master identification number.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

FIG. 2 is a diagram illustrating an exemplary simplified version of CAN message information stored in CAN databases, according to an exemplary embodiment of the present disclosure.

Figure 1:
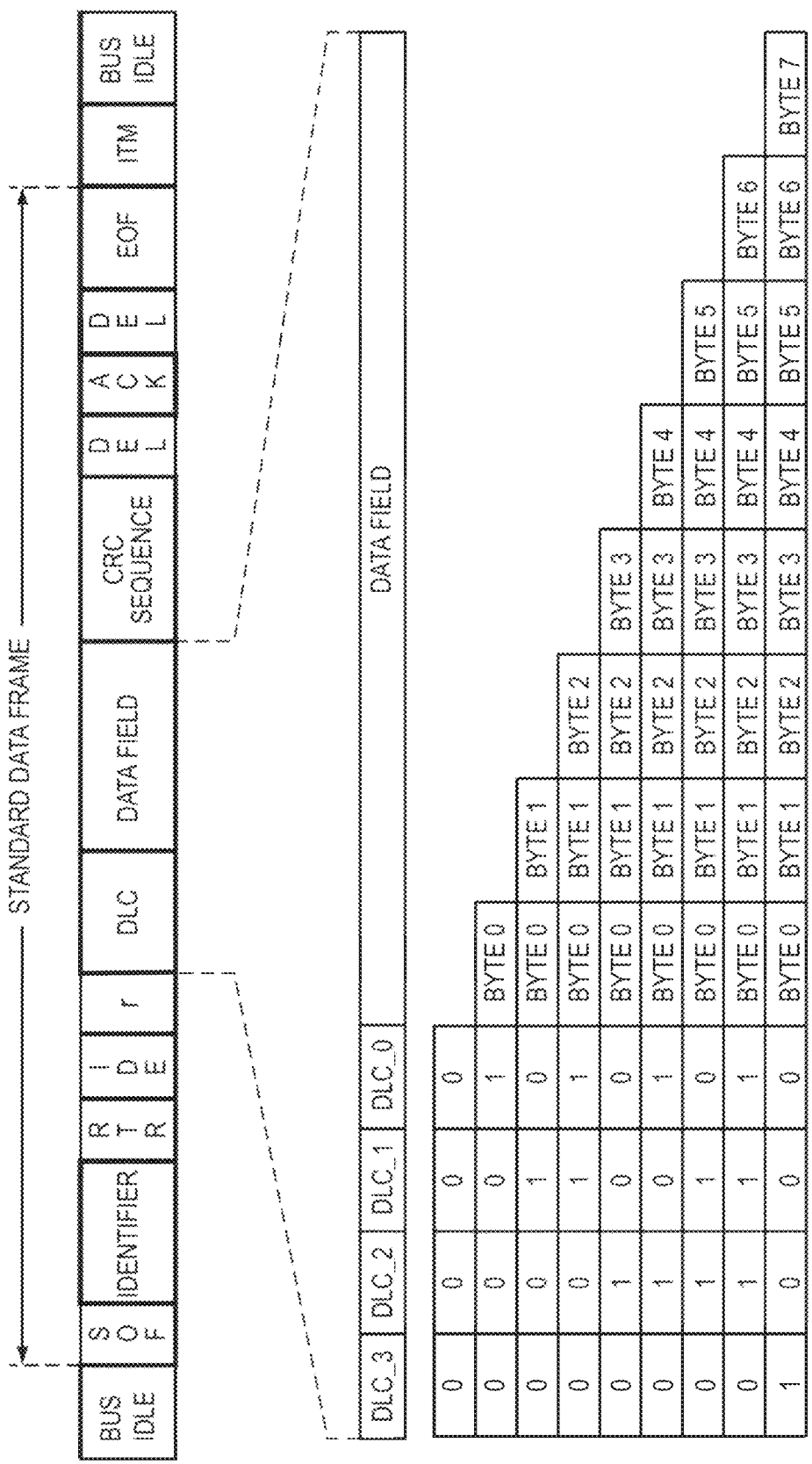
FIG. 1 is a diagram illustrating a conventional CAN data frame.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. The described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, includes hybrid vehicles, electric vehicles, plug-in hybrid electric vehicles, hydrogen-powered vehicles and other alternative fuel vehicles (e.g., fuels derived from resources other than petroleum), and further includes other "vehicles" such as trains, construction equipment, drones, spacecraft, and any other suitable example thereof. As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Additionally, it is understood that one or more of the below methods, or aspects thereof, may be executed by at least one control unit (or electronic control unit (ECU)). The at least one control unit or ECU may be implemented in a vehicle, as described herein. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a controller area network (CAN). The computer network may refer to a local network, a remote network (e.g., the cloud), or any suitable combination or variation thereof.

Referring now to embodiments of the present disclosure, the vehicle CAN may comprise a plurality of ECUs. Each ECU may be responsible for controlling certain components or functions of the vehicle (e.g., vehicle 900 of FIG. 9). As an example, the CAN may comprise a first ECU configured to control operations of the vehicle climate controls. The CAN may also comprise a second ECU configured to control operations of a vehicle cluster. The CAN may also comprise a third ECU configured to perform one or more operations of a vehicle infotainment system (e.g., audio-video-navigation (AVN) device). Each of the three ECUs may be configured to communicate with each other within the CAN over a CAN bus. According to an exemplary embodiment, the vehicle CAN and/or one or more of the ECU may comprise and/or be components of one or more computing devices (e.g., computing device 800 of FIG. 8).

It should be understood that this example is non-limiting and provided for demonstration purposes only.

The ECUs may be configured to utilize information stored in a CAN database for performing communication with each other in the CAN. For example, one or more CAN databases accessible by the ECUs may be configured to store CAN message information that provides an indication of how an ECU which receives an incoming CAN data frame should interpret the received information. The CAN message information may also be referred to as a CAN message reference.

In further detail, FIG. 2 is a diagram illustrating an exemplary simplified version of CAN message information 100 stored in CAN databases 110. As shown in FIG. 2, each of the plurality of CAN databases 110 (i.e., CAN Database 1 and CAN Database 2) may be configured to store the same CAN message information 100. However, the CAN message information 100, as stored in the CAN databases 110, may comprise a unique identification scheme configured for identifying the data field inputs. Thus, each CAN database 110 may be configured to store a unique configuration of the same CAN message information 100.

According to the example illustrated in FIG. 2, each table of CAN message information (i.e., CAN message reference), as stored in the two CAN databases 110, may contain three input data fields: speed, temperature, and engine temperature. Information stored in the data length code (DLC) field and payload byte fields for each of the three input data fields may be consistent across both CAN databases 110, but the identifiers (IDs) for the three input data fields may be unique across the CAN databases 110.

For instance, according to the CAN message information 100 stored in CAN Database 1, the input data field "Speed" corresponds to ID 100, the input data field "Temperature" corresponds to ID 101, and the input data field "Engine Temperature" corresponds to ID 102. Conversely, according to the CAN message information 100 stored in CAN Database 2, the input data field "Speed" corresponds to ID 102, the input data field "Temperature" corresponds to ID 100, and the input data field "Engine Temperature" corresponds to ID 101. Thus, each of the CAN message information 100 respectively stored in the CAN databases 110 may be uniquely configured via a unique identification scheme of a plurality of data fields of a CAN message (e.g., speed, temperature, engine temperature, etc.). It should be understood that this example is non-limiting and provided for demonstration purposes only.

The ECUs 120 may be configured to utilize the CAN message information 100 stored in a particular CAN database 110 for communicating with each other. Specifically, the ECUs 120 may refer to the IDs for each input data field, as shown in FIG. 2, to interpret CAN data received through the CAN bus 150 from another ECU.

Problematically, if a hacker obtains the CAN message information 100 being used as a reference by the ECUs 120, the hacker may be capable of decoding intercepted data. To protect against such an intrusion, it is contemplated that the ECUs 120 may utilize a shifting CAN message reference by changing the CAN database 110 in which to access CAN message information 100 on a periodic basis, so that a hacker is unable to know which stored CAN message information 100 is being used by the ECUs at a given time. More particularly, since the message IDs are changed across the CAN databases 110, a hacker may not be able to ascertain the correct IDs needed to decode data being transmitted across the CAN bus 150. This may cause the hacker to miscalculate the data byte length, resulting in an incorrect start of next frame, which further prevents the CAN messages from being surreptitiously decoded.

Figure 3:
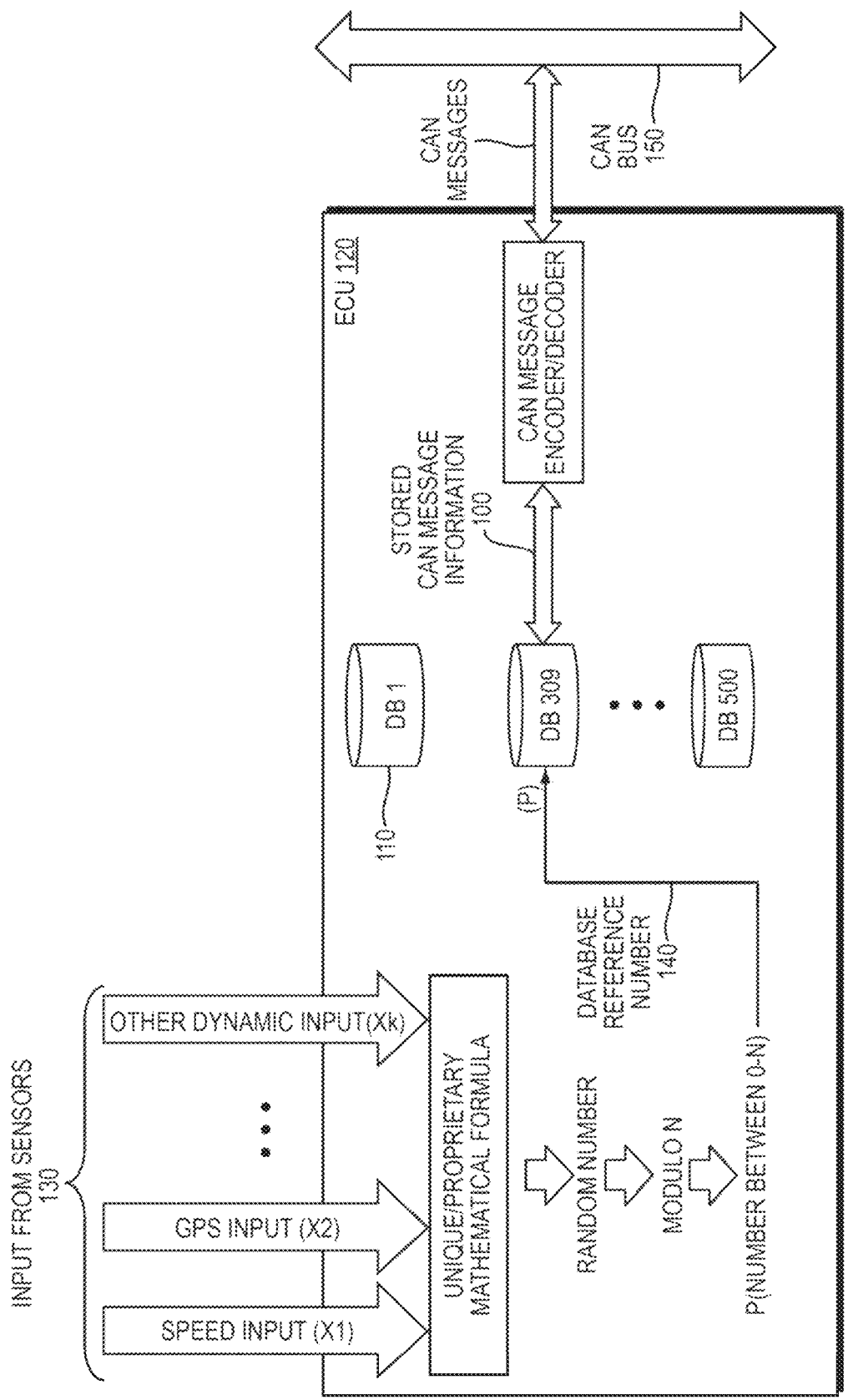
FIG. 3 is a flow chart illustrating an exemplary simplified procedure for controlling CAN communication using a shifting CAN message reference, according to an exemplary embodiment of the present disclosure.

In this regard, FIG. 3 illustrates an exemplary simplified procedure for controlling CAN communication using a shifting CAN message reference. As shown in FIG. 3, one or more ECUs 120 in the CAN may be configured to calculate a changing database reference number 140 that identifies a particular CAN database 110. The ECUs 120 may then access the CAN message information 100 stored in the identified CAN database 110, uniquely configured in the manner shown in FIG. 2, and use the CAN message information 100 for performing communication in the CAN.

Firstly, an ECU 120 may be configured to receive a plurality of measurement values deriving from a plurality of sensors 130 equipped in the vehicle. (It is noted that the following steps may be performed by a single ECU 120 or a plurality of ECUs 120.) The ECU 120 may be configured to communicate with any amount or type of sensors 130 in the vehicle, and likewise, the ECU 120 may be configured to receive any amount or type of measurement inputs from the sensors 130 such as, for instance, vehicle speed, engine revolutions per minute (RPM), vehicle odometer, cabin temperature, blower fan speed, windshield wiper speed, radio volume level, current radio frequency, user destination, and so forth.

Next, the ECU 120 may be configured to use these measurement inputs to calculate a database reference number 140 that identifies a particular CAN database 110 among the plurality of CAN databases. The ECU 120 may be configured to calculate the database reference number 140 in various ways. In one example, the ECU 120 may be configured to calculate the database reference number 140 using an equation with the measurement inputs received from the plurality of sensors 130 and one or more random numbers as parameters. The result of the calculation may be applied to a modulo (MOD) of N, where N is the total number of CAN databases 110 in the CAN.

As an example, an equation such as Equation 1, shown below, can be used by the ECU 120 to calculate the database reference number 140.

$$P = ((x1*R1 + x2*R2 + x3*R3 + x4*R4))\text{MOD} N \quad \text{Equation 1}$$

With respect to Equation 1, P may be the database reference number 140, x1, x2, x3, and x4 may represent measurement values received from four sensors 130 equipped in the vehicle, respectively, R1, R2, R3, and R4 may represent four distinct random numbers, respectively, and N may represent the total number of CAN databases 110.

As another example, an equation such as Equation 2, shown below, can be used by the ECU 120 to calculate the database reference number 140.

$$P = (R*(x1 + x2 + x3 + x4))\text{MOD} N \quad \text{Equation 2}$$

With respect to Equation 2, P may be the database reference number 140, x1, x2, x3, and x4 may represent measurement values received from four sensors 130 equipped in the vehicle, respectively, R may represent a random number, and N may represent the total number of CAN databases 110.

Any suitable equation, such as those above, which accepts as parameters one or more random numbers and the measurement inputs received from the sensors 130, may be used to calculate the database reference number 140. The formula for calculating the database reference number 140 may be adjusted to match a desired level of complexity. Thus, it should be understood that the above equations are non-limiting and provided for demonstration purposes only.

According to the example illustrated in FIG. 3, the total number of CAN databases 110 in the CAN is 500, and the database reference number 140 calculated using an equation as described above equals 309. As such, the CAN database 110 indexed as 309 among the 500 total CAN databases 110 can be used by the ECUs 120 as a reference for performing CAN communication. That is, the ECUs 120 can access the uniquely configured CAN message information 100 stored in the CAN database #309, and use that CAN message information 100 for communicating with each other across the CAN bus 150. It is noted, however, that the number of CAN databases 110 is not limited to 500 and may be greater or fewer than 500, while maintaining the spirit and functionality of the present disclosure.

Continuing in this hypothetical example, a first ECU 120 may be configured to transmit a message (i.e., CAN data frame) indicating a tail light status to other ECUs 120 in the CAN. The first ECU 120 may be configured to encode the message based upon the uniquely configured CAN message information 100 stored in the CAN database #309. A second ECU 120 may then receive the encoded message transmitted from the first ECU 120. The second ECU 120 may be configured to decode the message, or determine the contents thereof, using the same uniquely configured CAN message information 100 stored in the CAN database #309. It should be understood that this example is non-limiting and provided for demonstration purposes only.

The ECU 120 (or plurality of ECUs) may be configured to calculate a new database reference number 140 on a periodic basis such that any potential hackers may be prevented from knowing the CAN database 110 being used by the ECUs 120 for CAN communication at any given time. To this end, the ECU 120 may be configured to establish a plurality of periodic intervals during which each ECU 120 may perform CAN communication based upon the uniquely configured CAN message information stored in a particular CAN database 110. Whenever a subsequent or new interval among the plurality of periodic intervals begins, the database reference number 140 may be recalculated by the ECU 120 or, put another way, a new database reference number 140 may be calculated by the ECU 120. Upon such calculation, the ECUs 120 may be configured to perform CAN communication based upon the uniquely configured CAN message information 100 stored in the newly identified CAN database 110. Example processes for establishing the plurality of periodic intervals are described in greater detail below.

Figure 4:
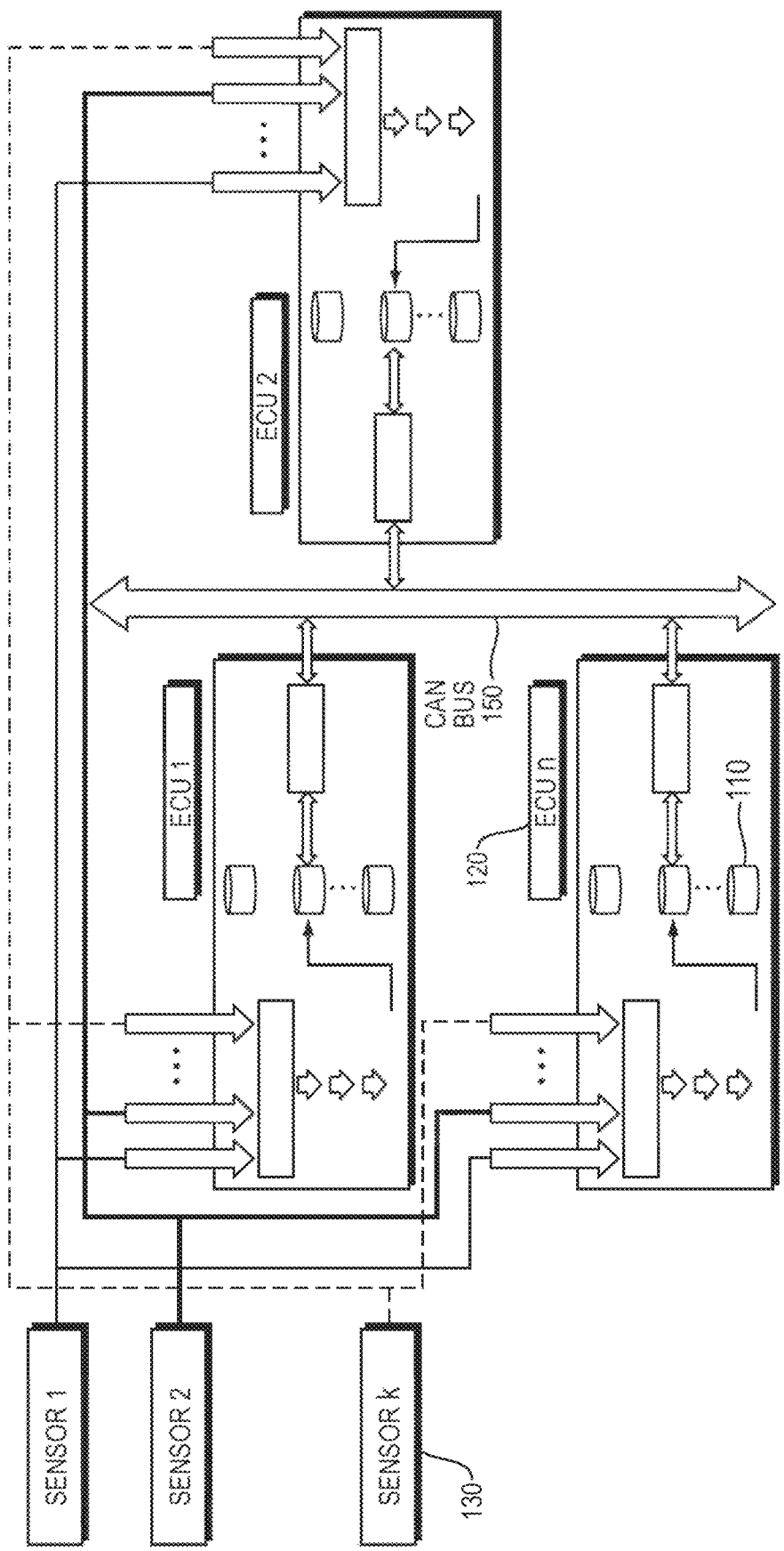
FIG. 4 is a diagram illustrating an exemplary mode of operation for controlling CAN communication using the shifting CAN message reference, according to an exemplary embodiment of the present disclosure.

The methods for controlling CAN communication using a shifting CAN message reference, as described herein, may be implemented using a variety of operation modes. For example, FIG. 4 is a diagram illustrating a first exemplary mode of operation for controlling CAN communication using the shifting CAN message reference. In the first exemplary mode of operation, a particular group of sensors 130 (e.g., Sensor 1, Sensor 2, . . . Sensor k) may provide common measurement values to each ECU 120 (e.g., ECU 1, ECU 2, . . . ECU n), as shown in FIG. 4. That is, all ECUs 120 may receive the same measurement inputs from the plurality of sensors 130.

In this exemplary mode of operation, each ECU 120 may be configured to independently calculate the database reference number 140 using the same equation, such as either of the example equations described above, with common measurement inputs provided to all ECUs 120. As a result, each ECU 120 may be configured to derive the same database reference number 140, allowing all ECUs 120 in the CAN to retrieve the same uniquely configured CAN message information 100 that is stored in the CAN database 110 corresponding to the database reference number 140. The ECUs 120 may then communicate with each other via the CAN bus 150 based upon the CAN message information 100.

As mentioned above, the ECUs 120 may be configured to calculate a new database reference number 140 on a periodic basis so as to shift the CAN message reference and thus deter hackers from decoding any intercepted messages. In this exemplary mode of operation, a plurality of periodic intervals during which each ECU 120 performs CAN communication based upon the uniquely configured CAN message information 100 stored in a particular CAN database 110 may be established according to a common time set by a time-keeping device equipped in the vehicle, such as an internal clock, a global positioning system (GPS) device, or the like. Thus, when a subsequent interval begins according to the common time set by the time-keeping device, the ECUs 120 may calculate a new database reference number 140. Upon such calculation, the ECUs 120 may perform CAN communication based upon the uniquely configured CAN message information 100 stored in the CAN database 110 newly identified by the database reference number 140.

In a second exemplary mode of operation, a master-slave relationship may be established among the plurality of ECUs 120. Particularly, a given ECU 120 among the plurality of ECUs 120 in the CAN may be designated as a master ECU. The master ECU may be responsible for controlling one or more operations of the method for controlling CAN communication.

Meanwhile, the remaining ECUs 120 may operate as slave ECUs.

In this exemplary mode of operation, all ECUs 120 may be configured to receive the same measurement inputs from the plurality of sensors 130, similar to the example illustrated in FIG. 4. Using the received sensor inputs, each ECU 120 may be configured to independently calculate the database reference number 140 with the same equation, such as either of the example equations described above. As a result, each ECU 120 may derive the same database reference number 140, allowing all ECUs 120 in the CAN to retrieve the same uniquely configured CAN message information 100 that is stored in the CAN database 110 corresponding to the database reference number 140. The ECUs 120 may then communicate with each other via the CAN bus 150 based upon the CAN message information 100.

In contrast with the first exemplary mode of operation, the second exemplary mode of operation involves the master ECU establishing the plurality of periodic intervals during which each ECU 120 performs CAN communication based upon the uniquely configured CAN message information 100 stored in a particular CAN database 110. For instance, the master ECU can define a plurality of database reference number calculation times, at each of which a new database reference number 140 must be calculated. In one example, the master ECU may be configured to define the database reference number calculation times according to fixed intervals (e.g., every 15 seconds, every 30 seconds, etc.) or any other suitable metric.

Then, the master ECU may be configured to transmit the defined plurality of database reference number calculation times to the slave ECUs. Once the slave ECUs have received the plurality of database reference number calculation times set by the master ECU, and a subsequent database reference number calculation time begins, the slave ECUs may be configured to calculate a new database reference number 140. (The master ECU may be configured to perform the calculation, as well.) Upon such calculation all ECUs 120 may perform CAN communication based upon the uniquely configured CAN message information 100 stored in the CAN database 110 newly identified by the database reference number 140.

In a third exemplary mode of operation, a master-slave relationship may again be established among the plurality of ECUs 120. Particularly, a given ECU 120 among the plurality of ECUs 120 in the CAN may be designated as a master ECU. The master ECU may be responsible for controlling one or more operations of the method for controlling CAN communication.

Meanwhile, the remaining ECUs 120 may operate as slave ECUs.

In contrast with the first and second modes of operation, only the master ECU may receive the measurement inputs from the plurality of sensors 130 in the third mode of operation. Using the received sensor inputs, the master ECU may be configured to calculate the database reference number 140 using an equation such as either of the example equations described above. In this case, the slave ECUs may not calculate the database reference number 140 and, as a result, the calculations may be limited to a single ECU (i.e., the master). Alternatively, the master ECU may be configured to transmit the measurement inputs to the slave ECUs, and the slave ECUs may also calculate the database reference number 140 using the measurement inputs received from the master ECU.

After calculating the database reference number 140, the master ECU may be configured to send the calculated database reference number 140 to the slave ECUs. This may allow all ECUs 120 to retrieve the same uniquely configured CAN message information 100 that is stored in the CAN database 110 corresponding to the database reference number 140. The ECUs 120 may then communicate with each other via the CAN bus 150 based upon the CAN message information 100.

Similar to the second exemplary mode of operation, the third exemplary mode of operation involves the master ECU establishing the plurality of periodic intervals during which each ECU 120 performs CAN communication based upon the uniquely configured CAN message information 100 stored in a particular CAN database 110. For instance, the master ECU may be configured to define a plurality of database reference number calculation times, at each of which a new database reference number 140 must be calculated. In one example, the master ECU may be configured to define the database reference number calculation times according to fixed intervals (e.g., every 15 seconds, every 30 seconds, etc.) or any other suitable metric.

Once a subsequent database reference number calculation time begins according to the master ECU's defined intervals, the master ECU may be configured to calculate a new database reference number 140, and transmit the same to the slave ECUs. All ECUs 120 may then perform CAN communication based upon the uniquely configured CAN message information 100 stored in the CAN database 110 newly identified by the database reference number 140.

In a fourth exemplary mode of operation, a rotating master-slave relationship may be established among the plurality of ECUs 120. That is, a given ECU 120 among the plurality of ECUs 120 in the CAN may be designated as a master ECU, in the same manner as described above, and new master ECUs may be designated at predefined times. The current master ECU may be responsible for designating a subsequent master ECU. Meanwhile, the remaining ECUs 120 may be configured to operate as slave ECUs.

Figure 5:
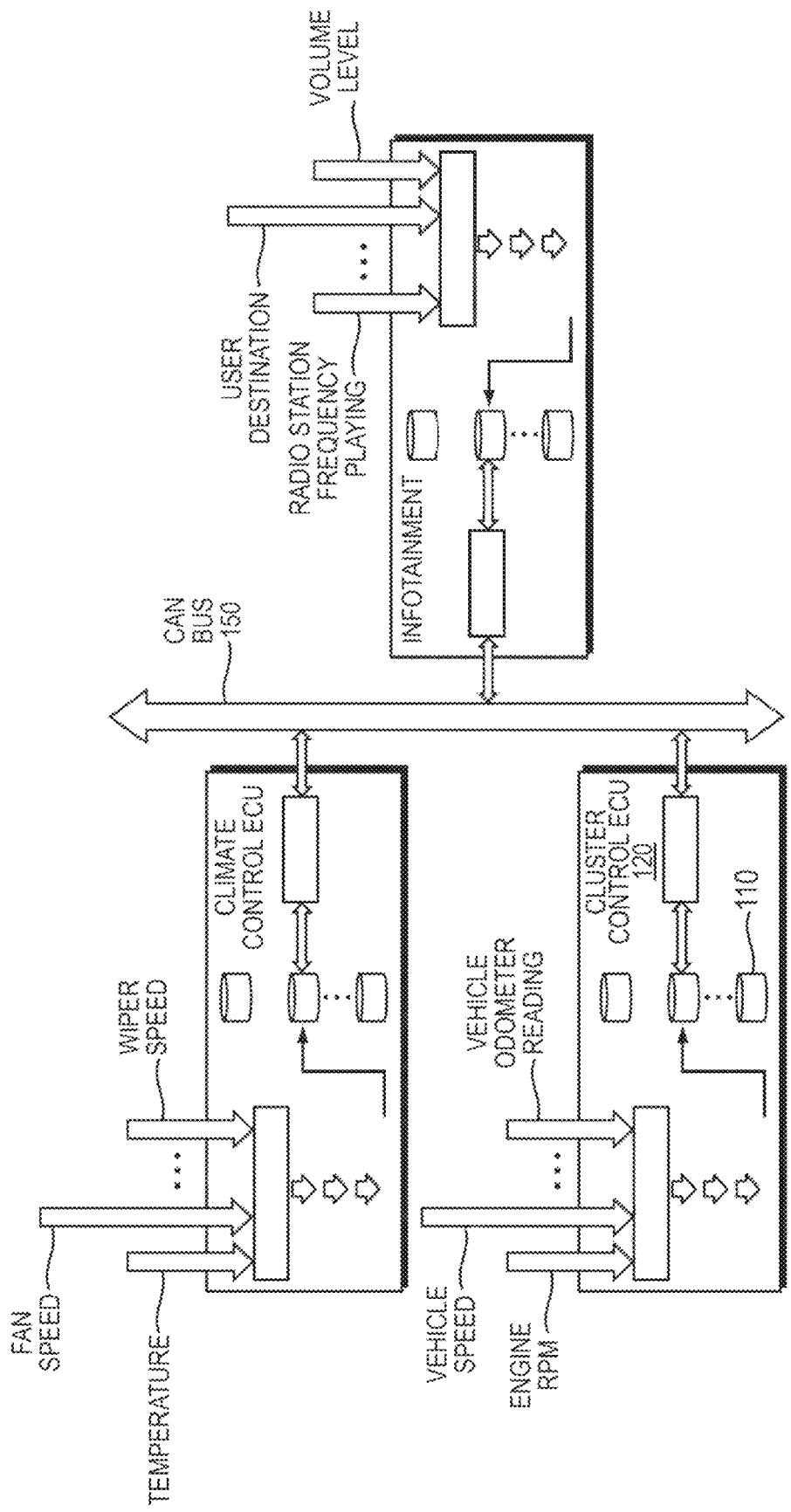
FIG. 5 is a diagram illustrating another exemplary mode of operation for controlling CAN communication using the shifting CAN message reference, according to an exemplary embodiment of the present disclosure.

FIG. 5 is a diagram illustrating the fourth exemplary mode of operation for controlling CAN communication using the shifting CAN message reference. In contrast with the first, second, and third modes of operation, in the fourth mode of operation, each ECU 120 may be configured to receive a plurality of measurement values deriving from a different group of sensors 130 respectively controlled by each ECU 120, as shown in FIG. 5. For instance, a climate control ECU may receive measurement values from sensors within the climate control system relating to cabin temperature, blower fan speed, and windshield wiper speed, a cluster control ECU may receive measurement values from sensors within the cluster system relating to engine RPM, vehicle speed, and the vehicle odometer, and an infotainment ECU may receive measurement values from sensors within the infotainment system relating to a radio station frequency, a user destination, and a radio volume level. As a result, each ECU 120 may be configured to receive a unique grouping of measurement values.

Using the received sensor inputs, only the presently acting master ECU may calculate the database reference number 140 using an equation such as either of the example equations described above. In this case, the slave ECUs may not calculate the database reference number 140 and, as a result, the calculations are limited to a single ECU (i.e., the ECU presently acting as master).

After calculating the database reference number 140, the master ECU may send the calculated database reference number 140 to the slave ECUs. This may allow all ECUs 120 to retrieve the same uniquely configured CAN message information 100 that is stored in the CAN database 110 corresponding to the database reference number 140. The ECUs 120 may then communicate with each other via the CAN bus 150 based upon the CAN message information 100.

In the fourth exemplary mode of operation, the master ECU may be configured to establish the plurality of periodic intervals during which each ECU 120 performs CAN communication based upon the uniquely configured CAN message information 100 stored in a particular CAN database 110. For instance, the master ECU may be configured to define a plurality of database reference number calculation times, at each of which a new database reference number 140 must be calculated. In one example, the master ECU may define the database reference number calculation times according to fixed intervals (e.g., every 15 seconds, every 30 seconds, etc.) or any other suitable metric.

Once a subsequent database reference number calculation time begins according to the master ECU's defined intervals, the master ECU may be configured to calculate a new database reference number 140 and transmit the same to the slave ECUs. All ECUs 120 may then perform CAN communication based upon the uniquely configured CAN message information 100 stored in the CAN database 110 newly identified by the database reference number 140.

Moreover, as mentioned above, the master ECU may be configured to designate a new master ECU at predefined times according to fixed intervals (e.g., every 15 seconds, every 30 seconds, etc.) or any other suitable metric. Upon designating a new master ECU, the current master ECU may be configured to send a message to the new master ECU notifying of the master designation. The new master ECU may then be responsible for performing the functions listed above.

According to an exemplary embodiment, a system may be configured to perform the second, third, and fourth modes of operation on the same system, using a remote transmission request (RTR) using a CAN remote frame.

Figure 6:
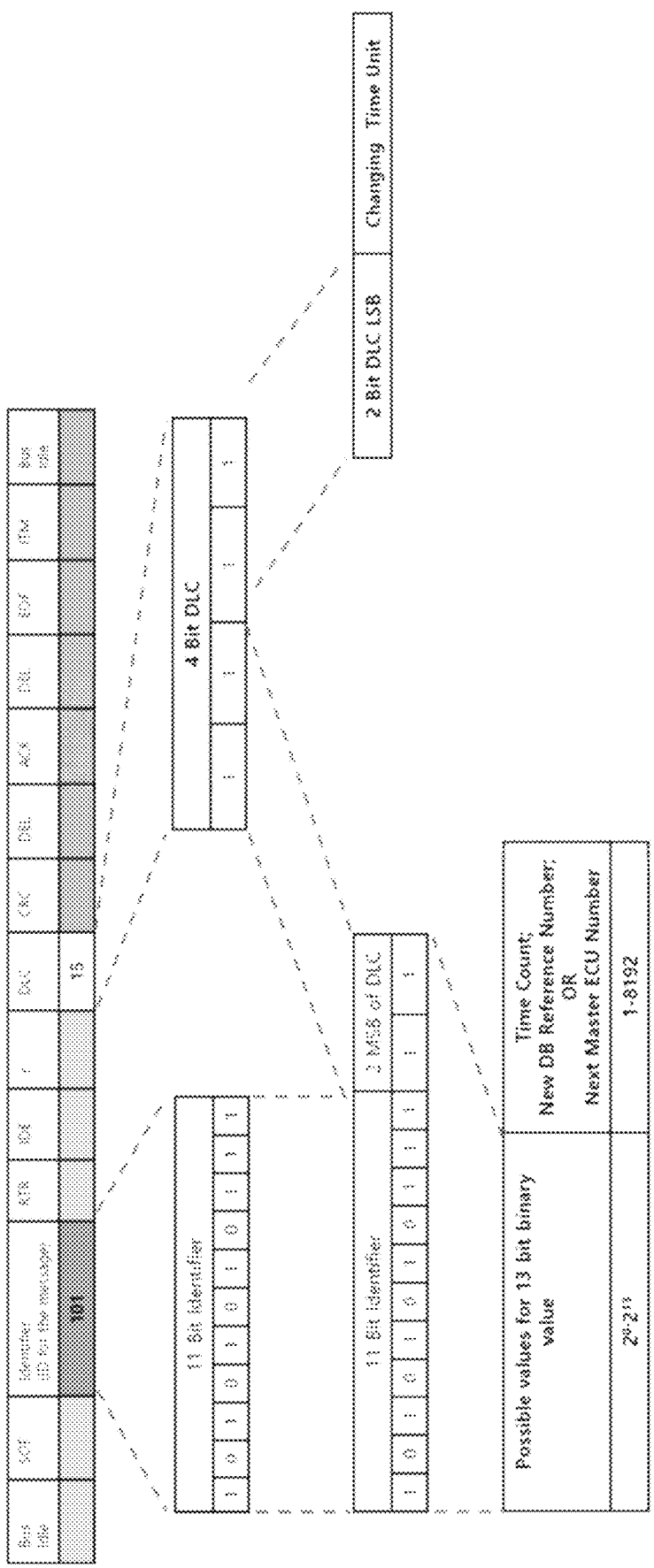
FIG. 6 is a diagram illustrating a CAN remote frame, according to an exemplary embodiment of the present disclosure.

In this regard, FIG. 6 is a diagram 600 illustrating a CAN data frame, according to an exemplary embodiments of the present disclosure. The purpose of a CAN remote frame is typically to request data such as, e.g., database reference number calculation time(s) and/or time intervals, new database (DB) reference number(s), new master identification (ID) number(s), or the like. The CAN remote frame is composed of several different components, each designated for performing a particular task, including a start of frame (SOF) bit, an identifier (ID) which sets the priority of the data frame, a remote transmission request (RTR) bit, an Identifier Extension (IDE) bit, a data length code (DLC), a cyclic redundancy check (CRC) sequence, a delimiter (DEL) bit, an acknowledgement (ACK) bit, and end of frame (EOF) bits. Among these, the payload bytes may be transported in the data field, and the DLC field may communicate the number of payload bytes to the receivers.

The identifier (ID) bit may comprise a suitable number of bits. As shown in FIG. 6, the identifier (ID) bit may comprise an 11-bit identifier. It is noted, however, that other size/length identifiers may be incorporated while maintaining the spirit and functionality of the present disclosure. As shown in FIG. 6, the data length code (DLC) is a 4 bit DLC. It is noted, however, that other size/length DLCs may be incorporated while maintaining the spirit and functionality of the present disclosure.

According to an exemplary embodiment, one or more of the least significant bits (LSBs) of the DLC may be used to determine a system mode of operation to be used (e.g., the second mode of operation 605, the third mode of operation 610, the fourth mode of operation 615, etc.).

According to an exemplary embodiment, the one or more of the LSBs of the DLC are compared against a database to determine the mode of operation. According to an exemplary embodiment, once the mode of operation is determined, one or more most significant bits (MSBs) of the DLC may be added to an end of the identifier generating an RTR message with an RTR request value comprising the identifier and the one or more MSBs of the DLC. According to an exemplary embodiment, the request value may be communicated through the CAN bus to be interpreted, resulting in the requested data being returned to the ECU 120 via the CAN bus. According to an exemplary embodiment, the RTR request value is associated with a requested answer value which is associated with the system mode of operation.

According to an exemplary embodiment, two MSBs may be added out of a 4-bit DLC to an 11-bit identifier (e.g., into a 2 LSB position of an 11-bit identifier) and, together, may form a 13-bit number whose range can extend along a range of possible values. According to an exemplary embodiment, the range of possible values may be from 1 to 8192.

Figure 7:
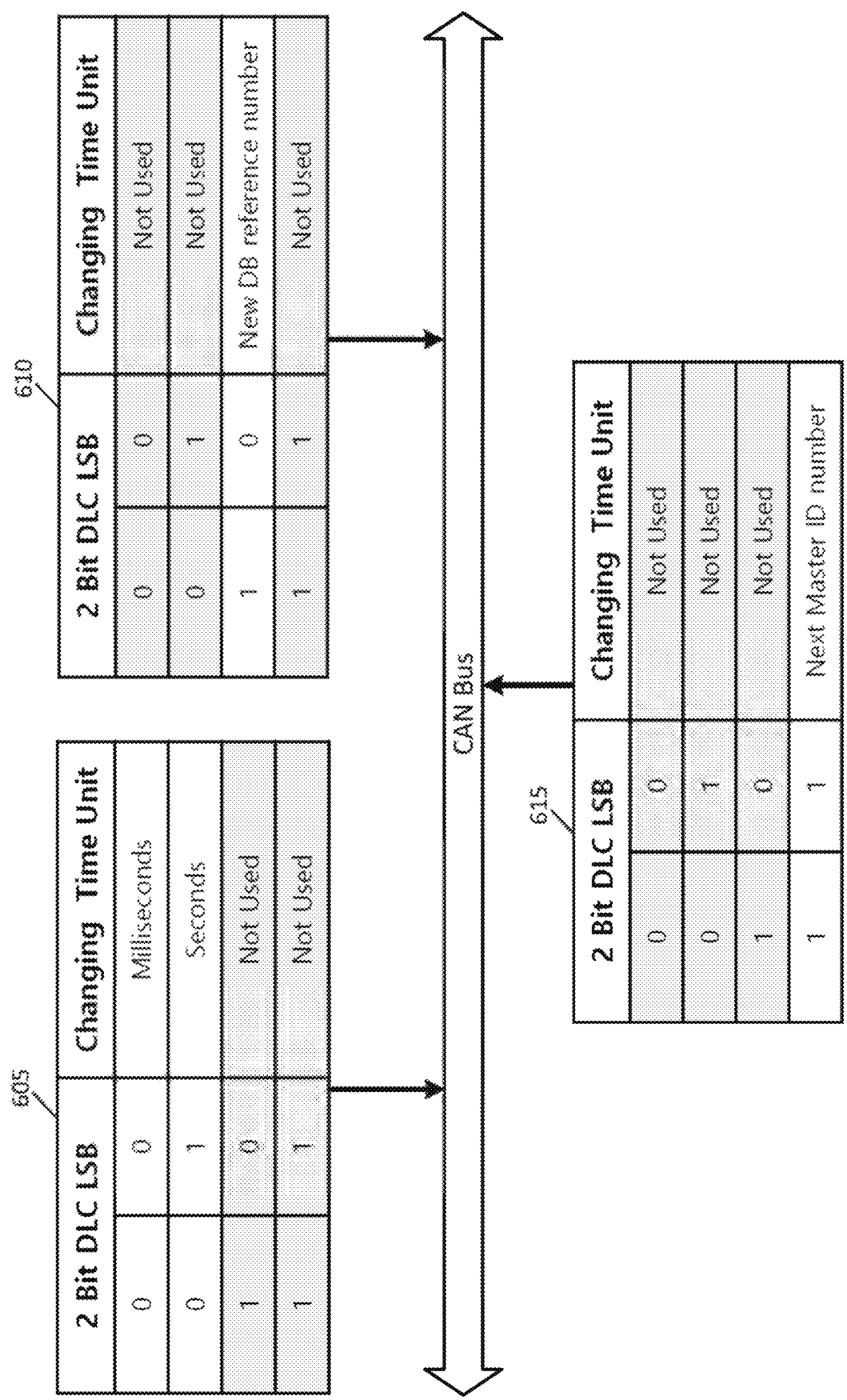
FIG. 7 is a diagram illustrating a procedure for determining an exemplary mode of operation for controlling CAN communication using the shifting CAN message reference, according to an exemplary embodiment of the present disclosure.

As shown in FIG. 7, according to an exemplary embodiment, when the one or more LSBs of the DLC correlate with the one or more LSBs of timing requests of the second mode of operation 605 (e.g., the time (e.g., milliseconds, seconds, etc.) at which the ECU 120 is to calculate the database reference number), one or more MSBs of the DLC may be added to the end of the identifier, generating an RTR request value, according to the second mode of operation, requesting the time at which the ECU 120 is to calculate the database reference number. The one or more LSBs of the DLC may be 1 LSB, 2 LSBs (as shown, e.g., in FIG. 7), 3 LSBs, and/or other suitable quantities of LSBs of the DLC. The one or more MSBs of the DLC to be added to the end of the identifier may be 1 MSB, 2 MSBs, 3 MSBs, and/or other suitable quantities of MSBs of the DLC.

As shown in FIG. 7, according to an exemplary embodiment, when the one or more LSBs of the DLC correlate with the one or more LSBs of requests for a new database reference number of the third mode of operation 610, one or more MSBs of the DLC may be added to the end of the identifier, generating an RTR request value, according to the third mode of operation, requesting the new database reference number. The one or more LSBs of the DLC may be 1 LSB, 2 LSBs (as shown, e.g., in FIG. 7), 3 LSBs, and/or other suitable quantities of LSBs of the DLC. The one or more MSBs of the DLC to be added to the end of the identifier may be 1 MSB, 2 MSBs, 3 MSBs, and/or other suitable quantities of MSBs of the DLC.

As shown in FIG. 7, according to an exemplary embodiment, when the one or more LSBs of the DLC correlate with the one or more LSBs of requests for a next master identification (ID) number of the fourth mode of operation 615, one or more MSBs of the DLC may be added to the end of the identifier, generating an RTR request value, according to the fourth mode of operation, requesting the next master ID number. The one or more LSBs of the DLC may be 1 LSB, 2 LSBs (as shown, e.g., in FIG. 7), 3 LSBs, and/or other suitable quantities of LSBs of the DLC. The one or more MSBs of the DLC to be added to the end of the identifier may be 1 MSB, 2 MSBs, 3 MSBs, and/or other suitable quantities of MSBs of the DLC.

According to an exemplary embodiment, the RTR message, with the RTR request value, may be sent to and/or received by each ECU 120 in the system. Based on the one or more LSBs of the DLC, the system may shift the mode of operation. According to an exemplary embodiment, the system may be configured to perform each of the second, third, and fourth modes of operation, and switch between operation modes, providing additional security, e.g., in systems which have sets of common random inputs and sets of exclusive inputs for each ECU 120.

It should be understood that all of the exemplary modes of operation described above are non-limiting and provided for demonstration purposes only. Additional modes of operation are possible, and the modes of operation described above can be modified in any suitable manner in accordance with the present claims.

Figure 8:
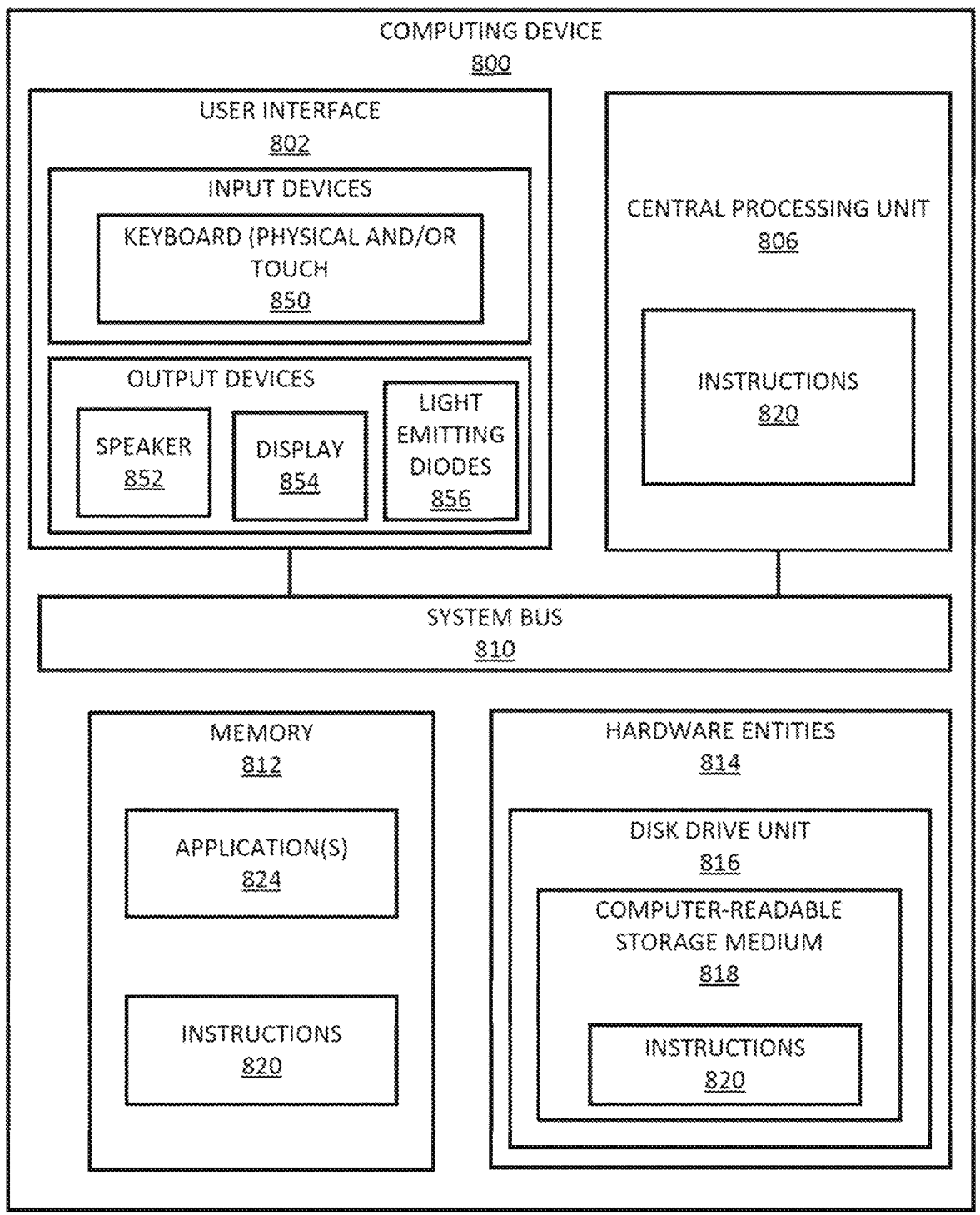
FIG. 8 illustrates example elements of a computing device, according to an exemplary embodiment of the present disclosure.

Referring now to FIG. 8, an illustration of an example architecture for a computing device 800 is provided. According to an exemplary embodiment, one or more functions of the present disclosure may be implemented by a computing device such as, e.g., computing device 800 or a computing device similar to computing device 800.

The hardware architecture of FIG. 8 represents one example implementation of a representative computing device configured to perform one or more methods and means for controlling CAN communication within a vehicle, as described herein. As such, the computing device 800 of FIG. 8 may be configured to implement at least a portion of the method(s) described herein and/or implement at least a portion of the functions of the system(s) described herein.

Some or all components of the computing device 800 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein. According to an exemplary embodiment, one or more computational functions may be computed on a server or over the cloud, while maintaining the spirit and functionality of the present disclosure. For example, one or more computational functions may be computed on a server or over the cloud when one or more details of one or more actual implementations are not known.

As shown in FIG. 8, the computing device 800 may comprise a user interface 802, a Central Processing Unit ("CPU") 806, a system bus 810, a memory 812 connected to and accessible by other portions of computing device 800 through system bus 810, and hardware entities 814 connected to system bus 810. The user interface may comprise input devices and output devices, which may be configured to facilitate user-software interactions for controlling operations of the computing device 800. The input devices may comprise, but are not limited to, a physical and/or touch keyboard 840. The input devices may be connected to the computing device 800 via a wired or wireless connection (e.g., a Bluetooth® connection). The output devices may comprise, but are not limited to, a speaker 842, a display 844, and/or light emitting diodes 846.

At least some of the hardware entities 814 may be configured to perform actions involving access to and use of memory 812, which may be a Random Access Memory (RAM), a disk driver and/or a Compact Disc Read Only Memory (CD-ROM), among other suitable memory types.

Hardware entities 814 may comprise a disk drive unit 816 comprising a computer-readable storage medium 818 on which may be stored one or more sets of instructions 820 (e.g., programming instructions such as, but not limited to, software code) configured to implement one or more of the methodologies, procedures, or functions described herein. The instructions 820 may also reside, completely or at least partially, within the memory 812 and/or within the CPU 806 during execution thereof by the computing device 800.

The memory 812 and the CPU 806 may also constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding, or carrying a set of instructions 820 for execution by the computing device 800 and that cause the computing device 800 to perform any one or more of the methodologies of the present disclosure.

Figure 9:
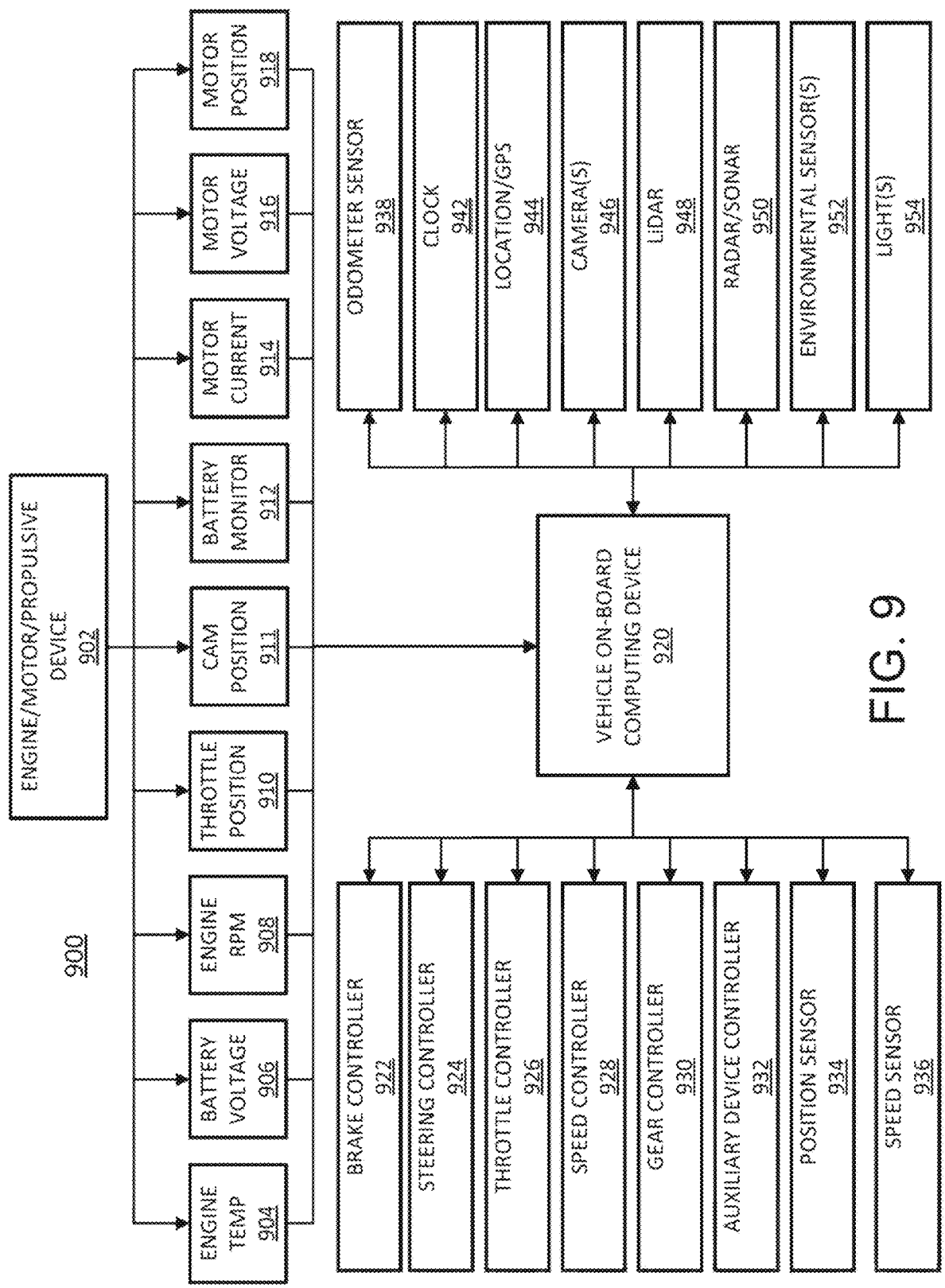
FIG. 9 illustrates an example architecture of a vehicle, according to an exemplary embodiment of the present disclosure.

Referring now to FIG. 9, an example vehicle system architecture 900 for a vehicle is provided, in accordance with an exemplary embodiment of the present disclosure.

As shown in FIG. 9, the vehicle system architecture 800 may comprise an engine, motor or propulsive device (e.g., a thruster) 902 and various sensors 904-918 for measuring various parameters of the vehicle system architecture 900. In gas-powered or hybrid vehicles having a fuel-powered engine, the sensors 904-918 may comprise, for example, an engine temperature sensor 904, a battery voltage sensor 906, an engine Rotations Per Minute (RPM) sensor 908, and/or a throttle position sensor 910, and a cam position sensor 911. If the vehicle is an electric or hybrid vehicle, then the vehicle may comprise an electric motor, and accordingly may comprise sensors such as a battery monitoring system 912 (to measure current, voltage and/or temperature of the battery), motor current 914 and voltage 916 sensors, and motor position sensors such as resolvers and encoders 918.

Operational parameter sensors that are common to both types of vehicles may comprise, for example: a position sensor 934 such as an accelerometer, gyroscope and/or inertial measurement unit; a speed sensor 936; and/or an odometer sensor 938. The vehicle system architecture 900 also may comprise a clock 942 that the system uses to determine vehicle time and/or date during operation. The clock 942 may be encoded into the vehicle on-board computing device 920, it may be a separate device, or multiple clocks may be available.

The vehicle system architecture 900 also may comprise various sensors that operate to gather information about the environment in which the vehicle is traveling. These sensors may comprise, for example: a location sensor 944 (for example, a Global Positioning System (GPS) device); object detection sensors such as one or more cameras 946; a LiDAR sensor system 948; and/or a RADAR and/or a sonar system 950. The sensors also may comprise environmental sensors 952 such as, e.g., a humidity sensor, a precipitation sensor, a light sensor, and/or ambient temperature sensor. The object detection sensors may be configured to enable the vehicle system architecture 900 to detect objects that are within a given distance range of the vehicle in any direction, while the environmental sensors 952 may be configured to collect data about environmental conditions within the vehicle's area of travel. According to an exemplary embodiment, the vehicle system architecture 900 may comprise one or more lights 954 (e.g., headlights, flood lights, flashlights, etc.).

During operations, information may be communicated from the sensors to an on-board computing device 920 (e.g., computing device 800 of FIG. 8). The on-board computing device 920 may be configured to analyze the data captured by the sensors and/or data received from data providers and may be configured to optionally control operations of the vehicle system architecture 900 based on results of the analysis. For example, the on-board computing device 920 may be configured to control: braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers. The brake controller 922 may comprise a pedal effort sensor, pedal effort sensor, and/or simulator temperature sensor, as described herein.

Geographic location information may be communicated from the location sensor 944 to the on-board computing device 920, which may then access a map of the environment that corresponds to the location information to determine known fixed features of the environment such as streets, buildings, stop signs and/or stop/go signals. Captured images from the cameras 946 and/or object detection information captured from sensors such as LiDAR 948 may be communicated from those sensors to the on-board computing device 920. The object detection information and/or captured images may be processed by the on-board computing device 920 to detect objects in proximity to the vehicle. Any known or to be known technique for making an object detection based on sensor data and/or captured images may be used in the embodiments disclosed in this document.

Accordingly, systems and methods are described herein for controlling CAN communication in a vehicle using a shifting CAN message reference that can enhance the security of communications between ECUs over the CAN bus. Because the formulae for calculating the database reference number are unknown to outside entities, it may be difficult for potential hackers to determine the CAN database being referenced by the ECUs. Moreover, the use of physical run time input from vehicle sensors can provide additional unpredictability to the CAN database switching logic to further thwart intrusions. In the event of a hacker attempting to inject harmful messages into the CAN, it may be detected by any ECU once the reference database changes since the hacker cannot predict the reference database change, and will be injecting old reference messages as a result. Also, even when a system is compromised (e.g., a hacker discovers all databases used in the CAN), a system breach may be detected faster because of the reference database switch, and a prevention mechanism can be promptly triggered.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for controlling controller area network (CAN) communication in a vehicle including a plurality of electronic control units (ECUs) and a plurality of CAN databases accessible by the plurality of ECUs, the method comprising:
   storing CAN message information in the plurality of CAN databases such that each CAN database stores a unique configuration of the CAN message information;
   determining a system mode of operation comprising:
      determining one or more least significant bits (LSBs) of a data length code (DLC); and
      comparing the one or more LSBs of the DLC against a database to determine the system mode of operation;
   generating a remote transmission request (RTR) message, comprising:
      determining one or more most significant bits (MSBs) of the DLC; and
      adding the one or more MSBs of the DLC to an end of an identifier, generating an RTR request value comprising the identifier and the one or more MSBs of the DLC, wherein the RTR request value is associated with a requested answer value which is associated with the system mode of operation;
   communicating the RTR message, through a CAN bus, to the plurality of ECUs;
   interpreting the RTR request value to determine the requested answer value;
   generating the requested answer value; and
   communicating the requested answer value to the plurality of ECUs.

2. The method of claim 1, wherein the one or more LSBs of the DLC comprises two LSBs of the DLC.

3. The method of claim 1, wherein the one or more MSBs of the DLC comprises two MSBs of the DLC.

4. The method of claim 1, wherein:
   the answer value comprises a time value at which each ECU performs CAN communication based upon the uniquely configured CAN message information stored in a particular CAN database among the plurality of CAN databases, and
   the particular CAN database is identified by a database reference number.

5. The method of claim 4, further comprising, when a subsequent interval among the plurality of periodic intervals begins:
   receiving a plurality of measurement values deriving from a plurality of sensors equipped in the vehicle;
   calculating a new database reference number by using the plurality of measurement values and one or more random numbers, the new database reference number newly identifying a particular CAN database among the plurality of CAN databases; and
   performing CAN communication, by each ECU, based upon the uniquely configured CAN message information stored in the newly identified CAN database.

6. The method of claim 4, wherein:
   the answer value comprises a new data reference number, and
   the new database reference number identifies a particular CAN database among the plurality of CAN databases.

7. The method of claim 1, further comprising:
   designating a particular ECU among the plurality of ECUs as a master ECU to control one or more operations of the method for controlling CAN communication,
   wherein:
      the remaining ECUs operate as slave ECUs, and
      the answer value comprises a next master identification number.

8. A system for controlling controller area network (CAN) communication in a vehicle, the system comprising:
   a plurality of electronic control units (ECUs) equipped in the vehicle;
   a plurality of CAN databases configured to store CAN message information such that each CAN database stores a unique configuration of the CAN message information;
   a plurality of sensors equipped in the vehicle communicatively coupled to the plurality of ECUs; and
   a CAN bus through which the plurality of ECUs are configured to perform CAN communication, wherein the plurality of ECUs, in performing the CAN communication, are configured to:
      determine a system mode of operation comprising:
         determining one or more least significant bits (LSBs) of a data length code (DLC); and
         comparing the one or more LSBs of the DLC against a database to determine the system mode of operation;
      generate a remote transmission request (RTR) message, comprising:
         determining one or more most significant bits (MSBs) of the DLC; and
         adding the one or more MSBs of the DLC to an end of an identifier, generating an RTR request value comprising the identifier and the one or more MSBs of the DLC, wherein the RTR request value is associated with a requested answer value which is associated with the system mode of operation;

communicate the RTR message, through a CAN bus, to the plurality of ECUs;

interpret the RTR request value to determine the requested answer value;

generate the requested answer value; and communicate the requested answer value to the plurality of ECU.

9. The system of claim 8, wherein:

the one or more LSBs of the DLC comprises two LSBs of the DLC, and the one or more MSBs of the DLC comprises two MSBs of the DLC.

10. The system of claim 8, wherein:

the answer value comprises a time value at which each ECU performs CAN communication based upon the uniquely configured CAN message information stored in a particular CAN database among the plurality of CAN databases, and the particular CAN database is identified by a database reference number.

11. The system of claim 10, wherein the plurality of ECUs, when a subsequent interval among the plurality of periodic intervals begins, are configured to:

receive a plurality of measurement values deriving from a plurality of sensors equipped in the vehicle;

calculate a new database reference number by using the plurality of measurement values and one or more random numbers, the new database reference number newly identifying a particular CAN database among the plurality of CAN databases; and perform CAN communication, by each ECU, based upon the uniquely configured CAN message information stored in the newly identified CAN database.

12. The system of claim 10, wherein:

the answer value comprises a new data reference number, and the new database reference number identifies a particular CAN database among the plurality of CAN databases.

13. The system of claim 8, wherein:

the plurality of ECUs are configured to designate a particular ECU among the plurality of ECUs as a master ECU to control one or more operations of the method for controlling CAN communication, the remaining ECUs operate as slave ECUs, and the answer value comprises a next master identification number.

14. A system for controlling controller area network (CAN) communication in a vehicle, the system comprising:

a plurality of electronic control units (ECUs) equipped in the vehicle;

a plurality of CAN databases configured to store CAN message information such that each CAN database stores a unique configuration of the CAN message information;

a plurality of sensors equipped in the vehicle communicatively coupled to the plurality of ECUs;

a CAN bus through which the plurality of ECUs are configured to perform CAN communication; and a computing device, comprising a processor and a memory, configured to store programming instructions that, when executed by the processor, are configured to cause the processor to:

determine a system mode of operation comprising:

determining one or more least significant bits (LSBs) of a data length code (DLC); and comparing the one or more LSBs of the DLC against a database to determine the system mode of operation;

generate a remote transmission request (RTR) message, comprising:

determining one or more most significant bits (MSBs) of the DLC; and adding the one or more MSBs of the DLC to an end of an identifier, generating an RTR request value comprising the identifier and the one or more MSBs of the DLC, wherein the RTR request value is associated with a requested answer value which is associated with the system mode of operation;

communicate the RTR message, through a CAN bus, to the plurality of ECUs;

interpret the RTR request value to determine the requested answer value;

generate the requested answer value; and communicate the requested answer value to the plurality of ECUs.

15. The system of claim 14, wherein the one or more LSBs of the DLC comprises two LSBs of the DLC.

16. The system of claim 14, wherein the one or more MSBs of the DLC comprises two MSBs of the DLC.

17. The system of claim 14, wherein:

the answer value comprises a time value at which each ECU performs CAN communication based upon the uniquely configured CAN message information stored in a particular CAN database among the plurality of CAN databases, and the particular CAN database is identified by a database reference number.

18. The system of claim 17, wherein the plurality of ECUs, when a subsequent interval among the plurality of periodic intervals begins, are configured to:

receive a plurality of measurement values deriving from a plurality of sensors equipped in the vehicle;

calculate a new database reference number by using the plurality of measurement values and one or more random numbers, the new database reference number newly identifying a particular CAN database among the plurality of CAN databases; and perform CAN communication, by each ECU, based upon the uniquely configured CAN message information stored in the newly identified CAN database.

19. The system of claim 17, wherein:

the answer value comprises a new data reference number, and the new database reference number identifies a particular CAN database among the plurality of CAN databases.

20. The system of claim 14, wherein:

the plurality of ECUs are configured to designate a particular ECU among the plurality of ECUs as a master ECU to control one or more operations of the method for controlling CAN communication, the remaining ECUs operate as slave ECUs, and the answer value comprises a next master identification number.

* * * * *